US012738548B2

(12) United States Patent
Venkateswaran et al.

(10) Patent No.: US 12,738,548 B2
(45) Date of Patent: Sep. 15, 2026

(54) WIRELESS BATTERY MANAGEMENT REVERSE WAKE UP

(71) Applicant: TEXAS INSTRUMENTS INCORPORATED, Dallas, TX (US)

(72) Inventors: Shyam Krishnan Venkateswaran, Atlanta, GA (US); Ariton E. Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 509 days.

(21) Appl. No.: 18/454,652

(22) Filed: Aug. 23, 2023

(65) Prior Publication Data

US 2025/0070280 A1 Feb. 27, 2025

(51) Int. Cl.
*H01M 10/42* (2006.01)
*H01M 10/48* (2006.01)
(Continued)

(52) U.S. Cl.
CPC ..... *H01M 10/4257* (2013.01); *H01M 10/482* (2013.01); *H02J 7/50* (2026.01); *H04W 8/005* (2013.01); *H04W 12/106* (2021.01); *H04W 52/0219* (2013.01); *B60R 16/033* (2013.01); *H01M 2010/4271* (2013.01); *H01M 2010/4278* (2013.01); *H04L 67/12* (2013.01)

(58) Field of Classification Search
CPC ......... H01M 10/4257; H04W 52/0219; H04W 8/005; H04W 12/106
USPC .................................................. 370/254, 311
See application file for complete search history.

(56) References Cited

U.S. PATENT DOCUMENTS 11,872,905 B2 * 1/2024 Xhafa ..................... B60L 58/10
12,252,035 B2 * 3/2025 Xhafa ................ H01M 10/441
(Continued)

FOREIGN PATENT DOCUMENTS

CN 210554268 U 5/2020
CN 119138069 A * 12/2024 ................ H02J 7/40
(Continued)

OTHER PUBLICATIONS

F. A. Rincon Vija, S. Cregut, G. Z. Papadopoulos and N. Montavont, "Autonomous Balancing Sleep Mode for Wireless BMS in Electric Vehicles," 2021 IEEE Conference on Standards for Communications and Networking (CSCN), Thessaloniki, Greece, 2021, pp. 65-71, doi: 10.1109/CSCN53733.2021.9686103. (Year: 2021).*
(Continued)

*Primary Examiner* — William D Cumming
(74) *Attorney, Agent, or Firm* — Carl G. Peterson; Frank D. Cimino

(57) ABSTRACT

In some examples, a battery management system (BMS) includes a set of battery cells and a secondary network node coupled to the set of battery cells. The secondary network node is configured to, responsive to determination by the secondary network node of an exception event, wirelessly transmit a series of periodically repeating reverse wake up data frames to a primary network node. The secondary network node is also configured to, responsive to receipt of a synchronization frame from the primary network node after transmitting the series of reverse wake up data frames, transmit an uplink data frame to the primary network node.

20 Claims, 6 Drawing Sheets

(51) Int. Cl.

| | |
|---|---|
| ***H02J 7/50*** | (2026.01) |
| ***H04W 8/00*** | (2009.01) |
| ***H04W 12/106*** | (2021.01) |
| ***H04W 52/02*** | (2009.01) |
| *B60R 16/033* | (2006.01) |
| *H04L 67/12* | (2022.01) |

(56) References Cited

U.S. PATENT DOCUMENTS

| | | | | |
|---|---|---|---|---|
| 12,261,737 | B2 * | 3/2025 | Burnight | H04L 41/12 |
| 12,550,127 | B2 * | 2/2026 | Xhafa | H02J 7/40 |
| 2020/0252328 | A1 * | 8/2020 | Agahi | H04L 49/201 |
| 2021/0320507 | A1 | 10/2021 | Hensley | |
| 2022/0332213 | A1 * | 10/2022 | Xhafa | B60L 53/66 |
| 2023/0042164 | A1 | 2/2023 | Xhafa et al. | |
| 2023/0063402 | A1 * | 3/2023 | Xhafa | H01M 10/425 |
| 2023/0087469 | A1 * | 3/2023 | Ekström | H02J 7/50 307/106 |
| 2023/0093000 | A1 * | 3/2023 | Ekström | H02J 1/106 320/127 |
| 2023/0121595 | A1 * | 4/2023 | Ekström | H02J 7/54 320/108 |
| 2023/0130666 | A1 * | 4/2023 | Xhafa | H04W 52/0219 370/311 |
| 2023/0208707 | A1 * | 6/2023 | Burnight | H04W 8/005 370/254 |
| 2023/0358811 | A1 * | 11/2023 | Urban | G01R 31/3648 |
| 2023/0388980 | A1 * | 11/2023 | Xhafa | H02J 7/40 |
| 2024/0064515 | A1 * | 2/2024 | Xhafa | H04W 12/106 |
| 2024/0069111 | A1 * | 2/2024 | Xhafa | H01M 10/425 |
| 2024/0222716 | A1 * | 7/2024 | Kambham | B60L 3/12 |
| 2025/0070280 | A1 * | 2/2025 | Venkateswaran | B60L 3/12 |
| 2025/0071699 | A1 * | 2/2025 | Venkateswaran | H04W 56/001 |
| 2025/0142476 | A1 * | 5/2025 | Venkateswaran | H02J 7/40 |
| 2025/0222820 | A1 * | 7/2025 | Xhafa | B60L 53/66 |
| 2025/0234193 | A1 * | 7/2025 | Venkateswaran | H04W 12/06 |
| 2025/0242718 | A1 * | 7/2025 | Xhafa | B60L 50/66 |

FOREIGN PATENT DOCUMENTS

| | | | | | |
|---|---|---|---|---|---|
| CN | 119731051 | A | * | 3/2025 | H01M 10/425 |
| CN | 120343546 | A | * | 7/2025 | B60L 50/64 |
| CN | 121002907 | A | * | 11/2025 | H02J 7/40 |
| CN | 121443480 | A | * | 1/2026 | H02J 7/50 |
| CN | 121464700 | A | * | 2/2026 | H04W 56/001 |
| DE | 112023003626 | T5 | * | 7/2025 | H01M 10/425 |
| JP | 2025520151 | A | * | 7/2025 | H02J 7/40 |
| JP | 2025531729 | A | * | 9/2025 | H01M 10/425 |
| KR | 20060131049 | A | * | 12/2006 | H04W 52/02 |
| KR | 100850912 | B1 | * | 8/2008 | H04W 88/02 |
| KR | 20250043319 | A | * | 3/2025 | H02J 7/80 |
| WO | WO-2023046745 | A1 | * | 3/2023 | H02J 7/80 |
| WO | WO-2023235373 | A1 | * | 12/2023 | H02J 7/40 |
| WO | WO-2024049735 | A1 | * | 3/2024 | G01R 31/371 |
| WO | WO-2025042933 | A1 | * | 2/2025 | H04W 56/001 |
| WO | WO-2025042936 | A1 | * | 2/2025 | H02J 7/50 |
| WO | WO-2025090762 | A1 | * | 5/2025 | H02J 13/12 |

OTHER PUBLICATIONS

ISR and WO mailed on Dec. 20, 2024, PCT Application No. PCT/US2024/043140 filed Aug. 21, 2024, 8 pages.

The Institute of Electrical and Electronics Engineers, Inc., "IEEE Standard for Low-Rate Wireless Networks," IEEE Std 802.15.4-2020, Jul. 23, 2020, pp. 1-39 and 136-143.

* cited by examiner

WIRELESS BATTERY MANAGEMENT REVERSE WAKE UP

BACKGROUND

Modern vehicles may include multiple battery cells. Information associated with the cells, such as temperature, voltage, and other indicators of cell status and health, may be monitored for vehicular safety and to facilitate proper operation. In a conventional wired battery management system, rechargeable batteries are managed by circuitry for the safe and efficient operation of the batteries. Wired communication interfaces can be used to connect a main microcontroller (the main node or master node) to each battery module (the secondary nodes), and each battery module is chained to the rest of the battery modules in a daisy chain. With wired communication interfaces, the main microcontroller cannot monitor and control all the battery modules in parallel without complex wiring. This wiring makes repair or replacement of individual battery cells more difficult, and importantly, adds weight and bulk to the overall system.

A wireless connection between the battery modules and the microcontroller makes management of battery modules more flexible and easier to repair. In a wireless battery management system (WBMS), a microcontroller monitors each battery module and communicates with the battery modules using wireless communication interfaces. The main microcontroller controls all the battery modules using a WBMS protocol. Wireless communication interfaces can suffer from wireless communication channel bandwidth variance, interference, and/or other issues, which would prevent proper monitoring and management in a WBMS.

SUMMARY

In some examples, a battery management system (BMS) includes a set of battery cells and a secondary network node coupled to the set of battery cells. The secondary network node is configured to, responsive to determination by the secondary network node of an exception event, wirelessly transmit a series of periodically repeating reverse wake up data frames to a primary network node. The secondary network node is also configured to, responsive to receipt of a synchronization frame from the primary network node after transmitting the series of reverse wake up data frames, transmit an uplink data frame to the primary network node.

In some examples, a method includes a secondary network node transmitting, responsive to determination of an exception event, a periodically repeating series of reverse wake up data frames to a primary network node. The method also includes, responsive to receipt of a synchronization frame from the primary network node after transmitting the series of reverse wake up data frames, transmitting, by the secondary network node, an uplink data frame to the primary network node.

In some examples, a method includes while in a low power state, waking, by a primary network node, from a low power state for a sample duration. The method also includes performing, by the primary network node, sampling during the sample duration. The method also includes, responsive to not detecting a reverse wake up data frame via the sampling, returning, by the primary network node, to the low power state. The method also includes, responsive to detecting a reverse wake up data frame from among a series of reverse wake up data frames transmitted by a secondary network node, transmitting, by the primary network node, a synchronization frame after an end of the series of reverse wake up data frames.

DETAILED DESCRIPTION

Figure 1:
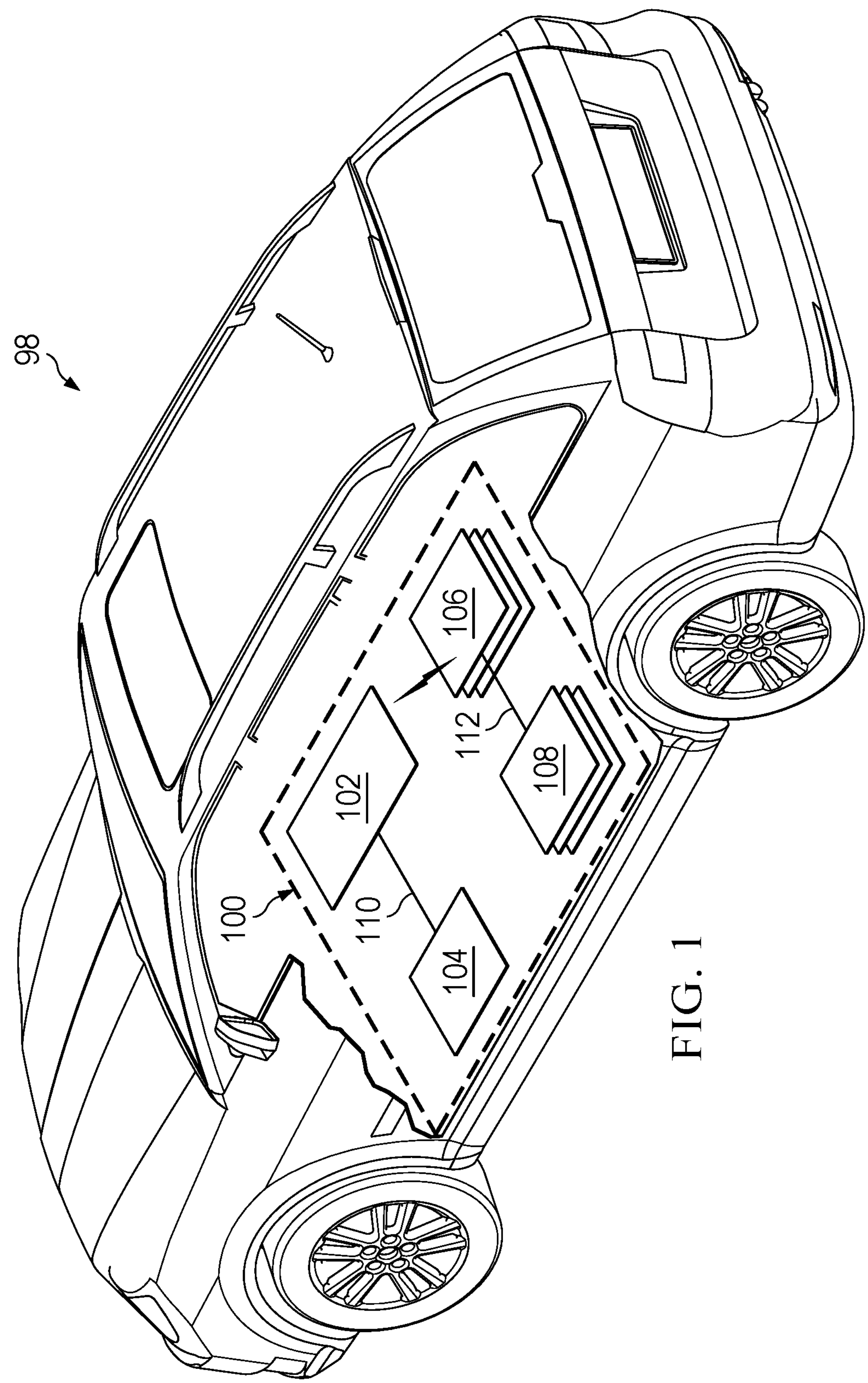
FIG. 1 is a block diagram of a wireless battery management system, in accordance with various examples.

Some electronic devices operate using batteries. For example, electric vehicles include multiple battery cells that provide power to those vehicles. Because battery cells in an electronic device can provide large amounts of power, and further because the power provided by the battery cells may be vital to the operation of the electronic device, the electronic device may include a system to manage the battery cells.

Battery management systems (BMSs) may manage the battery cells of an electronic device in various ways. For example, a BMS may monitor the health (e.g., voltage, current, temperature) of battery cells in an electronic device. Further, the BMS may control various battery cells to manage the quantity of power provided by the battery cells and where that power is directed within the electronic device. Generally, a BMS includes multiple components, such as multiple battery modules and a controller to manage the battery modules. Each battery module, in turn, may couple to multiple battery cells and include a battery monitor to monitor those battery cells. Thus, the battery cells coupled to a battery module provide power to the electronic device; the battery monitor in the battery module monitors the health and operation of the battery cells in that battery module; and the controller communicates with the battery monitor to ensure the battery module and its cells are operating properly. The controller may also communicate with the battery monitor to control the operation of the battery cells, such as to turn on, turn off, redirect, or otherwise balance the power provided by those battery cells.

BMSs may incorporate wireless technology. For example, a primary network node contains or is coupled to a controller and a secondary network node contains a battery module that controls multiple battery cells. The primary and secondary network nodes may communicate with each other wirelessly, for example using radio frequencies.

In some cases, it is desirable for the primary node and/or at least some of the secondary network nodes to enter a low power state. The low power state may also be referred to as a standby state or a sleep state. For example, entering the low power state may reduce power consumption of the BMS, prolonging a usable life of the BMS before recharge of the battery cells of the BMS. However, safety of a BMS, and the electronic device which includes the BMS, may be related to a speed with which the BMS can react to changes in the battery cells. Therefore, the BMS should still respond to exception events involving the battery cells in a timely manner, despite being in the low power state.

Described herein are various examples of a BMS that include a reverse wake up. An example BMS includes a primary network node and a set of secondary network nodes, with each secondary network node coupled to a set of battery cells (although the scope of this disclosure is not limited to battery applications). The primary network node controls the secondary network nodes, and the secondary network nodes communicate with their respective battery cells to control the battery cells and to receive status information about the battery cells (e.g., current, voltage, temperature) that may be communicated to the primary network node. The primary network node and the secondary network nodes may include a low power state in which the primary network node and the second network nodes consume less power than when not in the low power state. However, the primary network node and the secondary network nodes should still respond to exception events raised at the battery cells.

In an example, responsive to an exception event occurring at a battery cell, a secondary network node in a low power state may be configured to wake and begin transmitting a reverse wakeup data frame to the primary network node. In some examples, the secondary network node is configured to transmit multiple of the reverse wakeup data frames for a programmed interval. The primary network node may wake periodically and sample for a reverse wakeup data frame. Responsive to the sampling not identifying a reverse wakeup data frame, the primary network node may be configured to return to the low power state. However, responsive to the sampling identifying the reverse wakeup data frame transmitted by the secondary network node, the primary network node may be configured to wait until an end of the programmed interval. Responsive to the end of the programmed interval, the primary network node may be configured to transmit a sync frame to the secondary network node. Responsive to receipt of the sync frame, the secondary network node may be configured to transmit an uplink data frame to the primary network node. The uplink data frame may include information related to circumstances that gave rise to the exception event which woke the secondary network node from the low power state. Responsive to receipt of the uplink data frame, the primary network node may be configured to perform any suitable action, such as logging the information and returning to the low power state, issuing one or more commands to the secondary network node, generating a notification for a user, issuing one or more commands to other secondary network nodes, or any other suitable action. Subsequent to processing the uplink data frame, the primary network node may be configured to control the secondary network node to return to the low power state, and may itself return to the low power state.

FIG. 1 is a perspective view of an example system 98, such as an automotive vehicle, that includes a wireless battery management system (WBMS) 100. Although this system is described in the context of an automotive system and a battery management system, the techniques of this disclosure may be implemented in other systems such as home automation, industrial automation, and wireless sensor networks. Such systems may include one or more central nodes and two or more secondary nodes and may or may not be used for monitoring battery cells. In some examples, the system 98 is any system that may include a wireless battery management system to supply power to one or more components of the system 98. As shown, the wireless battery management system 100 includes a primary network node 102, a battery controller 104, a plurality of secondary network nodes 106, and a plurality of battery cells 108. Other example network architectures having multiple primary/main nodes can be used to implement the techniques of this disclosure. In an example, the wireless battery management system 100 may include a plurality of primary network nodes. Although this disclosure describes communication techniques primarily in the context of wireless systems, these techniques may also be useful for wired systems (e.g., where the connection between nodes 102 and 106 is wired). Additional example details of network architectures for WBMSs can be found in commonly assigned U.S. patent application Ser. No. 17/823,138, entitled "Multiple Primary Nodes for Wireless Battery Management System Robustness," filed on Aug. 30, 2022, and U.S. patent application Ser. No. 18/345,636, entitled "Hierarchical Wireless Battery Management System," filed on Jun. 30, 2023, each of which is incorporated by reference in its entirety.

In an example, the primary network node 102 is coupled to the battery controller 104 using a first wired connection 110. In an example, the first wired connection 110 between the primary network node 102 and the battery controller 104 is a universal asynchronous receiver/transmitter (UART), inter-integrated circuit (I2C), or the like. The secondary network nodes 106 are wirelessly coupled to the primary network node 102 and coupled to the battery cells 108 using a second wired connection 112.

In an example, the wireless battery management system 100 provides wireless radio frequency (RF) communication between the primary network node 102 and the secondary network nodes 106. In an example, the wireless RF communication uses the license-free 2.4 gigahertz (GHZ) industrial, scientific, and medical (ISM) band from 2.4 GHz to 2.483 GHZ, which is compliant with BLUETOOTH special interest group (SIG). In examples, the wireless battery management system 100 uses 2 megabits per second (Mbps) BLUETOOTH low energy (BLE) across the physical layer (PHY). The Open Systems Interconnection (OSI) model includes the PHY as a layer used for communicating raw bits over a physical medium. In this case, the PHY is free space, which the wireless battery management system 100 uses to wirelessly communicate between the primary network node 102 and the secondary network nodes 106. In an example, the transmission power of the wireless battery management system 100 is less than or equal to 10 decibel-milliwatts (dBm).

In an example, the wireless RF communication between the primary network node 102 and the secondary network nodes 106 utilizes frequency hopping and time slotted allocations to transmit and receive data across super frames (SFs). A super frame, also referred to as a super frame interval, is a time interval including time and frequency allocations for data exchanges between the primary network node 102 and the secondary network nodes 106, including interframe spacing between these allocations. Frequency hopping includes transmitting RF signals by rapidly changing the transmission frequency among many distinct frequencies occupying a spectral band. In an example, frequency hopping occurs based on a linear shift-back register and a master identification (ID) of the primary network node 102. The linear shift-back register uses linear bit rotation to indicate a pattern of frequencies on which the primary network node 102 and the secondary network nodes 106 will communicate. Time slotted allocations are time slots that are assigned either to the primary network node 102 or one or more of the secondary network nodes 106 for transmitting to either one or more of the secondary network nodes 106 or the primary network node 102. The time slotted allocations occur in a half-duplex mode, as both the primary network node 102 and the secondary network nodes 106 switch between transmit and receive modes according to the temporal moment specified in scan/pairing frames of exchanged data for downlink (DL)/uplink (UL) durations.

In an example, the wireless battery management system 100 uses frequency division multiple access (FDMA) and changes the frequency at which frames are transmitted between the primary network node 102 and the secondary network nodes 106 to increase robustness against interference. In an example, the wireless battery management system 100 uses frequency hopping tables, black listing of frequencies, and configuration channels to mitigate interference with other wireless networks. Frequency hopping occurs on a per super frame (SF) basis, where during the SF, time slotted allocations are used for frame exchange. Black listing is suspending the use of frequency channels that may be susceptible to interference. Configuration channels may be used for scanning, pairing, and negotiating communication between the primary network node 102 and the secondary network nodes 106.

In an example, the wireless RF communication between the primary network node 102 and the secondary network nodes 106 uses 40 channels, where a subset of the 40 channels (e.g., channels 37, 38, and 39) is used for system configuration and the remaining 37 channels are used to exchange data. In an example, a single channel may be used as a configuration channel.

In an example, the wireless battery management system 100 supports periodic and a-periodic data exchanges from the secondary network nodes 106 to the primary network node 102 using wireless RF communication. The primary network node 102 and the secondary network nodes 106 use a common data format structure for both periodic and a-periodic data exchanges. Periodic data exchange occurs based on a repetitive interval, while a-periodic data exchange does not occur based on a repetitive interval. The data format is a description of rules that the data populating a file will follow. Generally, the more thorough the description of the data format, the easier it is for validation rules to be written on both the sending and receiving sides of the wireless battery management system 100.

In an example, the primary network node 102 scans the network to obtain a master ID and discover the secondary network nodes 106. The primary network node 102 scans the network by transmitting a management frame to coordinate medium access, wakeup schedules, and clock synchronization within the secondary network nodes 106. The primary network node 102 also uses the management frame to learn about the secondary network nodes 106 in the network. Initially, the primary network node 102 performs a passive scan to obtain (or check for) a master ID value in use by other nodes and/or devices. The primary network node 102 then selects a master ID that is different from the master IDs used by other nodes and/or devices.

In an example, after the primary network node 102 has selected a master ID, the primary network node 102 transmits a scan request frame in every SF period as long as there are unconnected secondary network nodes 106 from the primary network node 102. In an example, the primary network node 102 is programmed with the total number of the secondary network nodes 106 to be connected to the primary network node 102. After all the secondary network nodes 106 are connected and confirmed, the primary network node 102 will not transmit any more scan requests. The scan request frames include information about the structure of the SF and the frame formatting of the DL and UL slots.

For the primary network node 102 to scan for the secondary network nodes 106, the primary network node 102 enters a scan state. In this state, the primary network node 102 transmits a scan request frame in every SF period. The secondary network nodes 106 reply to the primary network node 102 with a scan response and await a pairing request frame from the primary network node 102. After the secondary network nodes 106 receive the pairing request, the secondary network nodes 106 respond within the same SF in the frequency slot assigned by the primary network node 102. In examples, this exchange occurs in the configuration channels. No data exchanges occur in this state. Additional example details of establishing a communication channel can be found in commonly assigned U.S. patent application Ser. No. 17/233,106, entitled "Wireless Protocol for Battery Management," filed on Apr. 16, 2021; and U.S. patent application Ser. No. 17/399,793, entitled "Wireless Battery Management System Setup," filed on Aug. 11, 2021, each of which is incorporated herein by reference in its entirety.

In an example, transmission cycles or SFs depend on the number of secondary network nodes 106 and/or battery cells 108 in the network. The primary network node 102 determines the SF interval based on the number of secondary network nodes 106. Given a number of secondary network nodes 106, the primary network node 102 estimates the number of DL slots usable to transmit the packets to the secondary network nodes 106. Accordingly, the total number of slots in the communication time interval becomes the following:

$$\text{Total\_slots} = \text{nr\_of\_WD} + \text{nr\_DL\_slots},$$

where nr_of_WD is the number of secondary network devices and nr_DL_slots is the number of DL slots available to the secondary network devices.

The wireless battery management system 100 manages the battery cells 108 using the primary network node 102, the battery controller 104, and the secondary network nodes 106. The primary network node 102 and the secondary network nodes 106 communicate with each other about the state of the battery cells 108. The primary network node 102 and the secondary network nodes 106 may communicate with each other using various protocol formats. For example, the primary network node 102 and the secondary network nodes 106 use a DL protocol format and a UL protocol format, where each of the DL protocol format and the UL protocol format includes a frame control field to communicate battery management information. When the battery cells 108 notify the secondary network nodes 106 of a condition, the secondary network nodes 106 communicate to the primary network node 102 that the condition is present. The primary network node 102 receives the notification of the condition from the secondary network nodes 106 and alerts the battery controller 104 of the condition. The battery controller 104 determines a proper reaction to the condition and sends an instruction to the primary network node 102. The primary network node 102 transmits the instruction to the secondary network nodes 106. The secondary network nodes 106 receive the instruction to manage the battery cells 108 in response to the condition. The secondary network nodes 106 manage the battery cells 108 in response to the condition.

As described above, in some circumstances, the primary network node 102 may be in a low power state when the secondary network nodes 106 detect a condition, or exception event, e.g., relating to one or more battery cells 108. Examples of exception events include, but are not limited to, one of the secondary network nodes 106 detecting a temperature that exceeds a threshold, detecting a pressure that exceeds a threshold, or detecting a current or voltage that exceeds or falls below a threshold. Similarly, the secondary network nodes 106 may be in the low power state when the exception event occurs, and may be woken or returned to a normal power state responsive to detecting the exception event. In some examples, responsive to a secondary network node 106 detecting the exception event while the primary network node 102 is in the low power state, the secondary network node 106 transmits a reverse wakeup data frame to the primary network node 102. In some examples, the reverse wakeup data frame has a duration of $$T_{rWUF}^{duration}.$$

In some examples, the secondary network node 106 transmits the reverse wakeup data frame (which may be abbreviated as rWUF) in a repeating series with period $$T_{rWUF}^{period}$$

for an programmed interval $$T_{rWUF}^{interval}.$$

In some examples, the combined reverse wakeup data frames of one programmed interval bay be referred to as a rWUF train. At an expiration of the programmed interval, the secondary network node 106 may wait a programmed amount of time.

$$T_{rWU\_wait}^{max},$$

wait, to receive a response from the primary network node 106. For example, the secondary network node 106 may wait to receive a sync frame or a downlink data frame from the primary network node 106. Responsive to receiving the sync data frame, in some examples, the secondary network node 106 transmits an uplink data frame to the primary network node 102. The uplink data frame may include information related to the exception event occurring at the battery cells 108 which gave rise to the rWUF. In some examples, at an expiration of $$T_{rWU\_wait}^{max}$$

and when the secondary network node 106 has not received a response from the primary network node 102, the secondary network node 106 may transmit a second rWUF train. In some examples, $$T_{rWUF}^{duration}, T_{rWUF}^{period}, T_{rWUF}^{interval},$$

a number of reverse wakeup data frame in the rWUF train, or any combination thereof may be modified in the second rWUF train.

In some examples, the primary network node 102 is in the low power state when the secondary network node 106 detects the exception event. The primary network node 102 may wake from the low power state for a programmed sample period, $$T_{rWU\_WM}^{sample\_period}.$$

While awake during the programmed sample period, the primary network node 102 enters an active receive state and samples for a received rWUF for a sample duration of $$T_{rWU\_WM}^{sample\_duration}.$$

Responsive to the primary network node 102 not detecting a received rWUF during the sample duration, the primary network node 102 returns to the low power state. Responsive to the primary network node 102 detecting a received rWUF from the secondary network node 106 during the sample duration, the primary network node 102 waits for an end of the rWUF train. Responsive to the end of the rWUF train, the primary network node 102 transmits a sync frame to the secondary network node 106. Responsive to transmitting the sync frame, in some examples, the primary network node 102 receives an uplink data frame from the secondary network node 106. The primary network node 102 may take any suitable action responsive to receipt of the uplink data frame, or data included in the uplink data frame, such as controlling the secondary network node 106 to modify its operation, modifying operation of a battery cell 108 which gave rise to the exception event, controlling the secondary network node 106 to return to the low power state, controlling other secondary network nodes 106 to wake up, or the like.

Figure 2A:
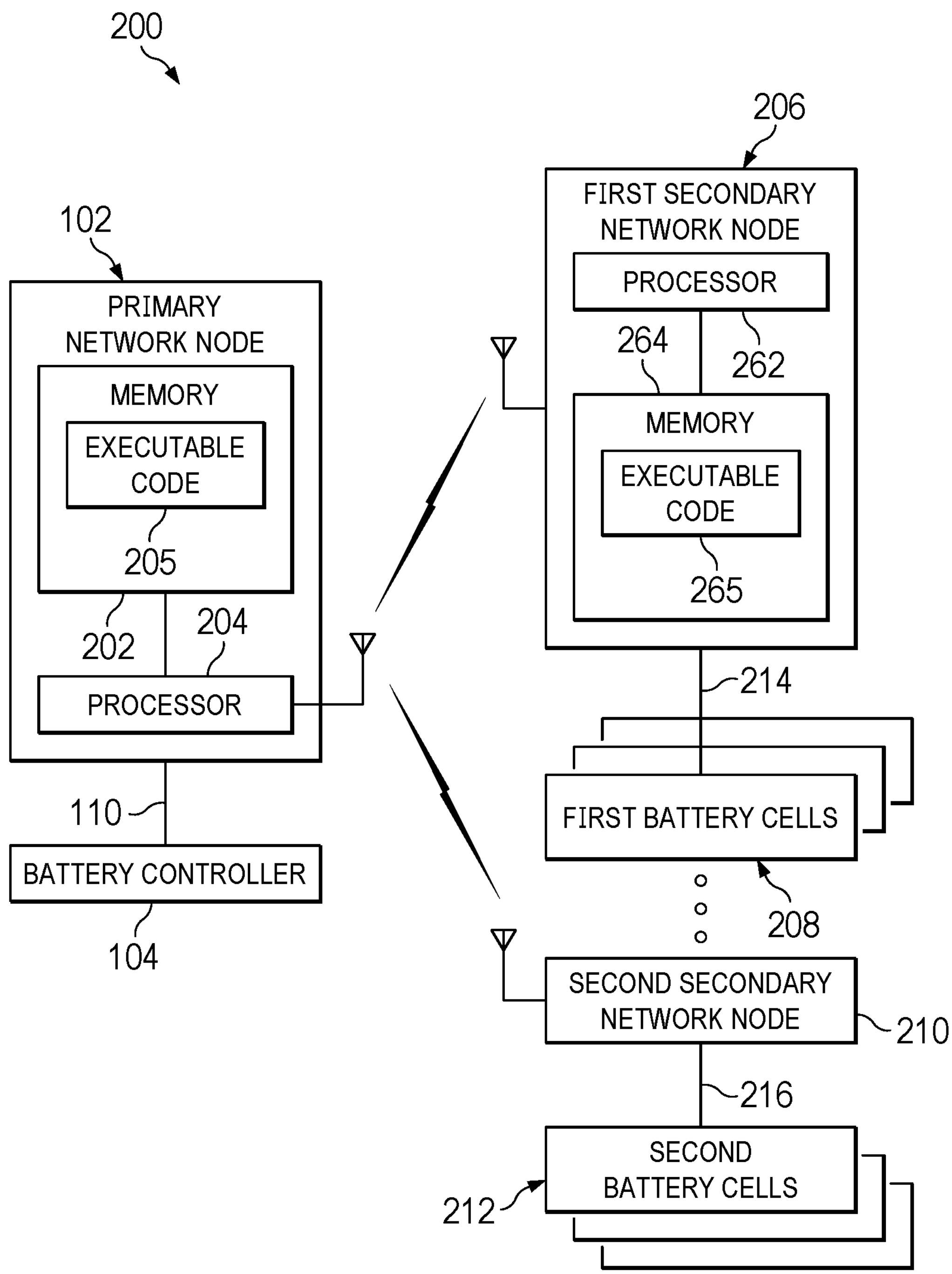
FIG. 2A is a block diagram of a wireless battery management system, in accordance with various examples.

FIG. 2A illustrates an example wireless battery management system 200. The wireless battery management system 200 is an example of the wireless battery management system 100 described above. As shown, the wireless battery management system 200 includes the primary network node 102, the battery controller 104, a memory 202, a processor 204, a first secondary network node 206, a first plurality of battery cells 208, a second secondary network node 210, and a second plurality of battery cells 212. Additional secondary network nodes 206, 210 may be included, although they are not expressly shown. The primary network node 102 includes the memory 202 and the processor 204 that is configured to execute code 205 stored on the memory 202 to perform one or more of the actions attributed herein to the primary network node 102. In an example, a portion of the memory 202 may be non-transitory and a portion of the memory 202 may be transitory. The secondary network nodes 206, 210 also may include processors and memory. For example, as shown, the secondary network node 206 includes a processor 262 coupled to a memory 264 storing code 265 that is executable by the processor 262 to perform one or more of the actions attributed herein to the secondary network node 206.

The primary network node 102 is coupled to the battery controller 104 using the first wired connection 110 and is wirelessly coupled to each of the secondary network nodes 206, 210. The first secondary network node 206 is coupled to the first plurality of battery cells 208 using a third wired connection 214 and wirelessly coupled to the primary network node 102. The second secondary network node 210 is coupled to the second plurality of battery cells 212 using a fourth wired connection 216 and wirelessly coupled to the primary network node 102. FIG. 2A does not limit the number of secondary network nodes in the wireless battery management system 200. Rather, the naming convention indicates that each of the secondary network nodes is coupled to a plurality of battery cells.

In an example, the primary network node 102 is wirelessly coupled to at least eight secondary network nodes 206, 210. In an example, each of the secondary network nodes 206, 210 can be coupled to at least sixteen battery cells using a wired connection. In examples, the wireless battery management system 200 includes one primary network node 102. In other examples, the wireless battery management system 200 includes multiple primary network nodes 102.

The wireless battery management system 200 manages the first plurality of battery cells 208 and the second plurality of battery cells 212 using the primary network node 102, the battery controller 104, the memory 202, the processor 204, the first secondary network node 206, and the second secondary network node 210. Instructions in the memory 202 cause the processor 204 to instruct the primary network node 102 to wirelessly communicate with the first secondary network node 206 and the second secondary network node 210 about the state of the first plurality of battery cells 208 and the second plurality of battery cells 212. The primary network node 102 and the secondary network nodes 206, 210 communicate using various protocol formats. For example, the primary network node 102 and the secondary network nodes 206, 210 use a DL protocol format and a UL protocol format, where each of the DL protocol format and the UL protocol format includes a frame control field to communicate battery management information. When the first secondary network node 206 detects a condition (e.g., relating to the first plurality of battery cells 208), the first secondary network node 206 communicates with the primary network node 102 that the condition is present. In some examples, the first secondary network node 206 can communicate with the primary network node 102 via a reverse wakeup process in which the first secondary network node 206 transmits a rWUF to the primary network node 102 prior to transmitting information about the condition (e.g., an exception event), as described elsewhere herein. The primary network node 102 receives the notification of the condition from the first secondary network node 206 and alerts the battery controller 104 of the condition. The battery controller 104 determines a proper reaction to the condition and sends an instruction to the primary network node 102. The primary network node 102 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition. A similar process may apply to the second secondary network node 210 when a condition is present in the second plurality of battery cells 212.

Figure 2B:
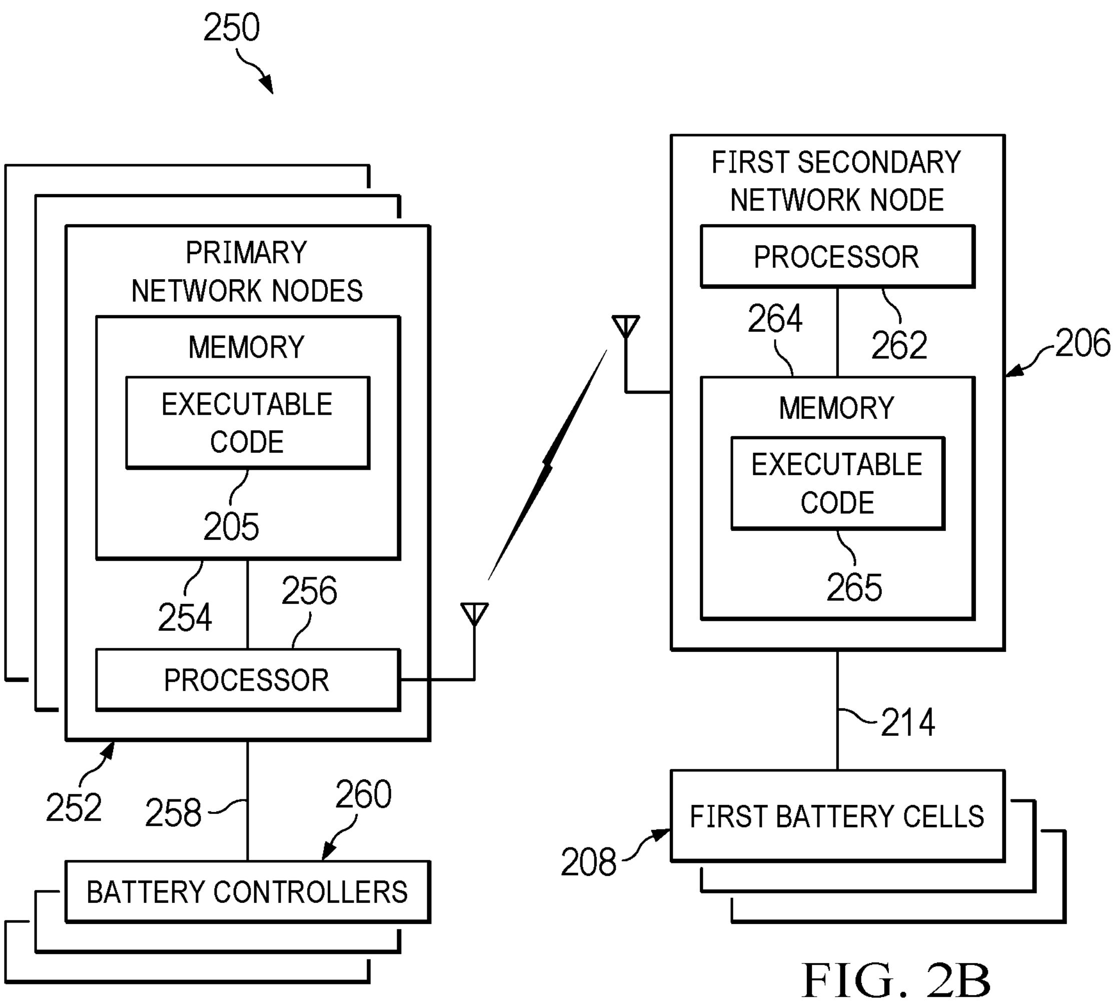
FIG. 2B is a block diagram of a wireless battery management system, in accordance with various examples.

FIG. 2B illustrates an example wireless battery management system 250. The wireless battery management system 250 is an example of the wireless battery management system 100 described above. As shown, the wireless battery management system 250 includes the first secondary network node 206, the first plurality of battery cells 208, a plurality of primary network nodes 252, a memory 254, a processor 256, a first wired connection 258, and a plurality of battery controllers 260. The plurality of primary network nodes 252 includes the memory 254 and the processor 256. In an example, a portion of the memory 254 may be non-transitory and a portion of the memory 254 may be transitory. In examples, the memory 254 includes executable code 255 which, when executed by the processor 256, causes the processor 256 to perform the actions attributed herein to the primary network node 252.

The plurality of primary network nodes 252 are coupled to the plurality of battery controllers 260 using the first wired connection 258 and are wirelessly coupled to the secondary network node 206. The first secondary network node 206 is coupled to the first plurality of battery cells 208 using the wired connection 214 and wirelessly coupled to the plurality of primary network nodes 252. As shown in FIG. 2A, the first secondary network node 206 may include a processor and memory (e.g., processor 262 and memory 264). FIG. 2B does not limit the number of secondary network nodes in the wireless battery management system 250. In an example, each of the plurality of primary network nodes 252 is wirelessly coupled to at least eight secondary network nodes. In an example, the first secondary network node 206 can be coupled to at least sixteen battery cells using the fourth wired connection 216.

The wireless battery management system 250 manages the first plurality of battery cells 208 using the plurality of primary network nodes 252, the plurality of battery controllers 260, the memory 254, the processor 256, and the first secondary network node 206. Instructions in the memory 254 cause the processor 256 to instruct the plurality of primary network nodes 252 to wirelessly communicate with the first secondary network node 206 about the state of the first plurality of battery cells 208. The plurality of primary network nodes 252 and the first secondary network node 206 communicate using various protocol formats. For example, the plurality of primary network nodes 252 and the first secondary network node 206 use a DL protocol format and a UL protocol format, where each of the DL protocol format and the UL protocol format includes a frame control field to communicate battery management information. When the first secondary network node 206 detects a condition, the first secondary network node 206 communicates with the plurality of primary network nodes 252 that the condition is present. In some examples, the communication can occur via a reverse wakeup process in which the first secondary network node 206 transmits a rWUF to the plurality of primary network nodes 252 prior to transmitting information about the condition (e.g., an exception event), as described elsewhere herein. The plurality of primary network nodes 252 receives the notification of the condition from the first secondary network node 206 and alerts the plurality of battery controllers 260 of the condition. The plurality of battery controllers 260 determines a proper reaction to the condition and sends an instruction to the plurality of primary network nodes 252. The plurality of primary network nodes 252 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition.

In an example, the first secondary network node 206 communicates with a first primary network node of the plurality of primary network nodes 252 based on instructions from a master controller (not shown). The first secondary network node 206 can transition communication from the first primary network node to a second primary network node of the plurality of primary network nodes 252. The first primary network node and the second primary network node communicate with each other to coordinate transferring the active connections of the first secondary network node 206 from the first primary network node to the second primary network node. In an example, the first primary network node communicates with the first secondary network node 206 and the second primary network node monitors a status of the first primary network node. The status can indicate whether the first primary network node has power and is operating within normal operating conditions. The first primary network node provides a clock signal to the second primary network node to synchronize communication. The first primary network node and the second primary network node select different frequencies to communicate with the first secondary network node 206. Selecting different frequencies allows the plurality of primary network nodes 252 to minimize interference when communicating to the first secondary network node 206. For example, if the first primary network node were to lose power, or if the status of the first primary network node were to fall out of normal operating conditions, then the second primary network node can connect to the first secondary network node 206 to supplement communication until the first primary network node can operate normally again.

Figure 3:
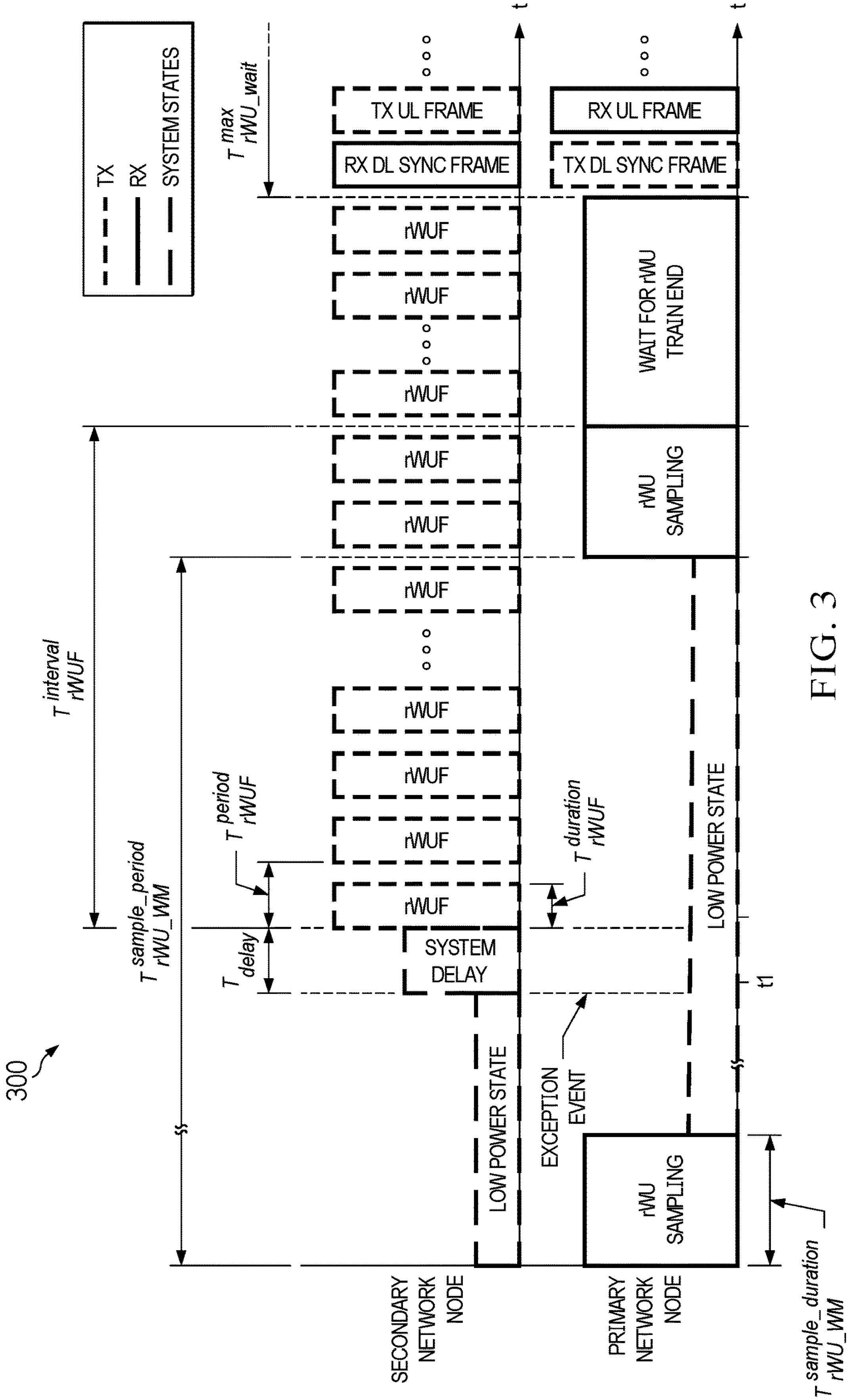
FIG. 3 illustrates communication in a reverse wakeup process usable by a wireless battery management system, in accordance with various examples.

FIG. 3 illustrates an example of communication in a reverse wakeup process 300 usable by a wireless battery management system, e.g., the wireless battery management system 100. In an example, a secondary network node (e.g., the secondary network node 106 or first secondary network node 206) communicates with a primary network node (e.g., the primary network node 102) to report an exception event related to a battery cell (e.g., the battery cell 108) or some other condition detected by the secondary network node. In some examples, the wireless battery management system includes a low power state in which at least some components of the wireless battery management system may be in a low power state, reducing power consumption by the wireless battery management system.

As shown in FIG. 3, the primary network node wakes and performs rWUF sampling for $$T_{rWU\_WM}^{sample\_duration}$$

once every $$T_{rWU\_WM}^{sample\_period}.$$

Figure 5:
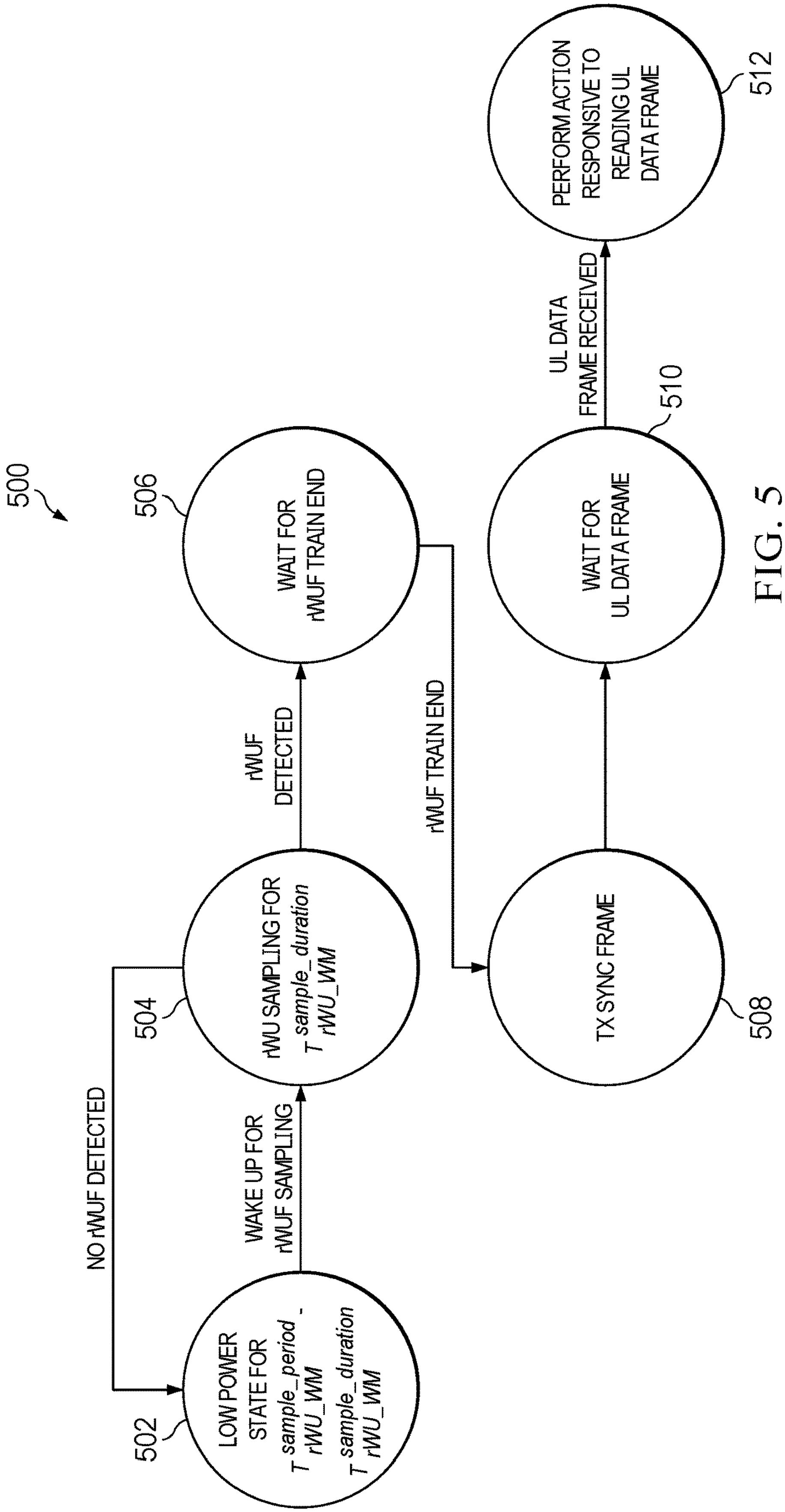
FIG. 5 is a state diagram of a state machine, in accordance with various examples.

Responsive to not detecting a rWUF during the rWUF sampling, the primary network node returns to the low power state, as shown in FIG. 5. In an example, while in a low power state, at time t1 an exception event occurs and is reported to the secondary network node. In some examples, the exception event is reported in the form of a notification transmitted to the secondary network node from a battery cell. Following a system delay having a duration of $T_{delay}$, the secondary network node broadcasts a series of reverse wakeup data frames. In some examples, the system delay may be an inherent or naturally occurring delay that is not intentionally inserted into the system. For example, the system delay may generally indicate that some non-zero amount of time is consumed after the exception event is generated or detected by the secondary network node and before the secondary network node transmits a rWUF. As described above, each reverse wakeup data frame has a duration of $$T_{rWUF}^{duration}$$

and the secondary network node broadcasts the reverse wakeup data frames in a repeating series (e.g., a rWUF train) with period $$T_{rWUF}^{period}$$

for an programmed interval $$T_{rWUF}^{interval}.$$

In some examples, each rWUF includes an identifier of the secondary network node broadcasting the rWUF, such as a network address of the secondary network node, an exception identifier that indicates a nature of the exception event, an indication of a total number of instances of the rWUF in the rWUF train, and, in some examples, an indication of a number of the current rWUF being broadcast. In other examples, instead of the number of the current rWUF being broadcast, the rWUF may include an indication of a remaining number of rWUF left in the rWUF train.

Responsive to detecting a rWUF during the rWUF sampling, the primary network node waits for an end of the rWUF frame, as indicated based on the contents of the detected rWUF. Following the end of the rWUF train, the primary network node transmits a sync frame to the secondary network node. In some examples, the sync frame instructs the secondary network node to transmit uplink data, interrupts, system info, or any other information that the secondary network node is waiting to transmit. The sync frame may indicate to the secondary network node that the primary network node will listen in a specified frequency and time slot, and the secondary network node may therefore transmit information for receipt by the primary network node. Thus, responsive to receiving the sync frame within the period $$T_{rWU\_wait}^{max},$$

the secondary network node transmits an uplink data frame to the primary network node. In various examples, the primary network node may take any suitable action responsive to receiving and/or reading the uplink data frame received from the secondary network node. For example, the primary network node may transmit information included in the uplink data frame to another device, such as a controller, may transmit instructions to the secondary network node, such as in a downlink data frame, may transmit instructions to other secondary network nodes, or the like.

In an example, the transmissions of the process 300 can be at the same frequency or at different frequencies. If the transmissions are at different frequencies, the change in frequency is based on a hopping sequence for the communication of the primary network node and the secondary network node.

In some examples, certain restrictions may exist in timing of the communications shown in FIG. 3. For example, $$T_{rWU}^{interval}$$

must be shorter than $$T_{rWU}^{max}$$

minus a wake up duration of the secondary network node minus $$T_{rWU}^{interval}$$

In some examples, a shorter $$T_{rWU\_wait}^{max}.$$

interval results in the primary network node waking up more frequently, reducing power savings realized via the low power state. In some examples, $$T_{rWUF}^{period}$$

must be greater than or equal to $$T_{rWUF}^{duration},$$

where a longer $$T_{rWUF}^{duration}$$

results in longer sampling periods $$T_{rWU\_WM}^{sample\_duration},$$

and a shorter $$T_{rWUF}^{duration}$$

results in in increased power consumption by the secondary network node. In some examples, $$T_{rWU\_wait}^{max}$$

is greater than a duration of the sync frame (or more generally, a downlink frame from the primary network node) and an inter frame space (e.g., time interval between the end of one frame transmission and the beginning of the next).

$$T_{rWU\_WM}^{sample\_period}$$

is less than $$T_{rWU}^{interval}.$$

In some examples, $$T_{rWU\_WM}^{sample\_period}$$

is equal to or approximately equal to $$T_{rWU}^{interval}/2.$$

In other examples, $$T_{rWU\_WM}^{sample\_period}$$

is any other suitable value less than $$T_{rWU}^{interval}.$$

In some examples, a shorter $$T_{rWU\_WM}^{sample\_period}$$

results in the primary network node waking up more frequently, reducing power savings realized via the low power state. In some examples, $$T_{rWU\_WM}^{sample\_duration}$$

is greater than or equal to $$2 * T_{rWUF}^{period},$$

where a longer $$T_{rWU\_WM}^{sample\_duration}$$

results in in increased power consumption by the primary network node.

Figure 4:
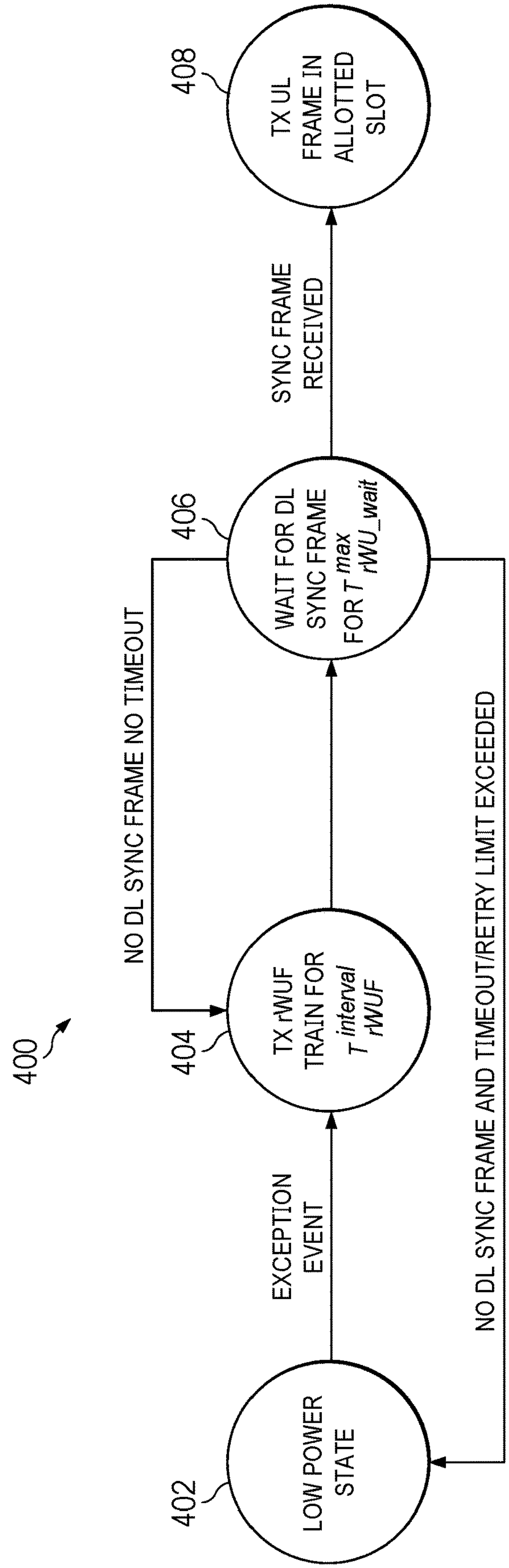
FIG. 4 is a state diagram of a state machine, in accordance with various examples.

FIG. 4 is a state diagram of a state machine 400, in accordance with various examples. In some examples, the state machine 400 may be implemented by a secondary network node, such as the secondary network node 106 and/or 206. In some examples, the state machine 400 may be implemented via computer-executable instructions stored among the executable code 265 and executed by the processor 262. In an example, the state machine 400 controls operation of the secondary network node to perform a reverse wakeup of a primary network node, such as the primary network node 102. For example, the state machine 400 is implemented as a method of controlling the secondary network node and/or the primary network node, such as to perform a reverse wake up as described herein. Although FIG. 4 can be implemented by the state machine 400, the secondary network node may be configured to implement the techniques of this disclosure and of FIG. 4 with or without a state machine.

At state 402, the secondary network node operates in a low power state. Responsive to detecting an exception event, such as by receiving a signal from a battery cell, the secondary network node transitions to state 404. At state 404, the secondary network node transmits (e.g., broadcasts) a rWUF train for $$T_{rWUF}^{interval},$$

as described above herein, before transitioning to state 406. At state 406, the secondary network node waits the length of $$T_{rWU\_wait}^{max}$$

for receipt of a downlink sync frame.

In some examples, responsive to not receiving the downlink sync frame within $$T_{rWU\_wait}^{max},$$

the secondary network node returns to state 404 to transmit a second rWUF train. In some examples, one or more characteristics of the second rWUF train may vary, such as a value of $$T_{rWUF}^{interval},$$

a number of rWUF in the rWUF train, or any other suitable characteristic or characteristics. In other examples, the second rWUF frame may be identical to the previously transmitted rWUF train. In some examples, a limit (e.g., a retry limit) may exist for a number of times the secondary network node returns to state 404 and transmits an additional rWUF in response to not receiving the downlink sync frame within $$T_{rWU\_wait}^{max}.$$

In such examples, responsive to not receiving the downlink sync frame within $$T_{rWU\_wait}^{max}$$

and the retry limit being met or exceeded, the secondary network node returns to state 402. Responsive to receiving the downlink sync frame within $$T_{rWU\_wait}^{max},$$

the secondary network node transitions to state 408 and transmit an uplink data frame, as described above herein. The uplink data frame may include information related to the battery cell that gave rise to the exception event, or any other suitable information that may be useful to the primary network node. Although not shown in FIG. 4, in various examples, the secondary network node returns from state 408 to state 402, or to any other suitable state based on instructions received from the primary network node.

FIG. 5 is a state diagram of a state machine 500, in accordance with various examples. In some examples, the state machine 500 may be implemented by a primary network node, such as the primary network node 102. In some examples, the state machine 500 may be implemented via computer-executable instructions stored among the executable code 205 and executed by the processor 204. In an example, the state machine 500 controls operation of the primary network node to detect and respond to a reverse wakeup data frame received from a secondary network node, such as the secondary network node 106 and/or 206. For example, the state machine 500 is implemented as a method of controlling the secondary network node and/or the primary network node, such as to perform a reverse wake up as described herein. Although FIG. 5 can be implemented by the state machine 500, the primary network node may be configured to implement the techniques of this disclosure and of FIG. 5 with or without a state machine.

At state 502, the primary network node operates in a low power state for a duration of $$T_{rWU\_WM}^{sample\_period} - T_{rWU\_WM}^{sample\_duration}.$$

Responsive to expiration of the state duration, the primary network node wakes from the low power state and transition to state 504. At state 504, the primary network node performs sampling of a specified or programmed frequency channel or frequency range for a rWUF for a duration of $$T_{rWU\_WM}^{sample\_duration}.$$

Responsive to not detecting a rWUF within $$T_{rWU\_WM}^{sample\_duration},$$

the primary network node returns to state 502. Responsive to detecting a rWUF within $$T_{rWU\_WM}^{sample\_duration},$$

the primary network node transitions to state 506. At state 506, the primary network node waits for an end of a rWUF train which includes the detected rWUF. In some examples, the end of the rWUF train may be determined based on data (e.g., a rWUF count) included within the rWUFs of the rWUF train. Responsive to the rWUF train ending, at state 508 the primary network node transmits a sync frame to the secondary network node which transmitted the rWUF train, as described above herein. Following transmission of the sync frame, at state 510 the primary network node waits for an uplink data frame from the secondary network node. For example, while operating in state 510 the primary network node monitors the specified or programmed frequency channel or frequency range for receipt of the uplink data frame from the secondary network node. Responsive to receipt of the uplink data frame from the secondary network node, the primary network node transitions to state 512. At state 512, the primary network node performs one or more actions based on contents of the received uplink data frame. The primary network node may be configured to take any suitable action responsive to reading the uplink data frame received from the secondary network node. For example, the primary network node may transmit information included in the uplink data frame to another device, such as a controller, may transmit instructions to the secondary network node, may transmit instructions to other secondary network nodes, or the like.

The term "couple" is used in the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means +/−10 percent of the stated value. Modifications are possible in the described examples, and other examples are possible within the scope of the claims.

What is claimed is:

1. A battery management system (BMS), comprising:
- a set of battery cells; and
- a secondary network node coupled to the set of battery cells, the secondary network node configured to:
  - responsive to determination by the secondary network node of an exception event, wirelessly transmit a series of periodically repeating reverse wake up data frames to a primary network node; and
  - responsive to receipt of a synchronization frame from the primary network node after transmitting the series of reverse wake up data frames, transmit an uplink data frame to the primary network node.

2. The BMS of claim 1, wherein:
- the series of reverse wake up data frames is a first series of reverse wake up data frames; and
- the secondary network node is configured to, responsive to not receiving a synchronization frame from the primary network node within a first amount of time after transmitting the first series of reverse wake up data frames, transmit a second series of reverse wake up data frames.

3. The BMS of claim 2, wherein the second series of reverse wake up data frames includes a greater number of reverse wake up data frames than the first series of reverse wake up data frames.

4. The BMS of claim 1, wherein each reverse wake up data frame includes an identifier of the secondary network node, an identifier of the exception event, a number of reverse wake up data frames included in the series of reverse wake up data frames, and an indicator of a current reverse wake up data frame being transmitted in the series of reverse wake up data frames.

5. The BMS of claim 4, wherein the indicator of the current reverse wake up data frame being transmitted in the series of reverse wake up data frames is one of a number of the current reverse wake up data frames in the series of reverse wake up data frames or a number of reverse wake up data frames remaining in the series of reverse wake up data frames.

6. The BMS of claim 1, wherein the BMS further comprises the primary network node wirelessly coupled to the secondary network node, the primary network node configured to:
- while in a low power state, wake from the low power state for a second period of time;
- perform sampling for the second period of time;
- responsive to not detecting a reverse wake up data frame via the sampling, return to the low power state; and
- responsive to detecting a reverse wake up data frame from among the series of reverse wake up data frames, transmit the synchronization frame after an end of the series of reverse wake up data frames.

7. The BMS of claim 1, wherein the secondary network node is configured to generate each reverse wake up data frame to include an identifier of the exception event.

8. The BMS of claim 7, further comprising:
a second set of battery cells; and
a third network node coupled to the second set of battery cells, wherein the third network node is configured to exit a low power state in response to the identifier of the exception event.

9. A method, comprising:
a secondary network node transmitting, responsive to determination of an exception event, a periodically repeating series of reverse wake up data frames to a primary network node; and
responsive to receipt of a synchronization frame from the primary network node after transmitting the series of reverse wake up data frames, transmitting, by the secondary network node, an uplink data frame to the primary network node.

10. The method of claim 9, wherein the series of reverse wake up data frames is a first series of reverse wake up data frames, the method further comprising responsive to not receiving a synchronization frame from the primary network node within a first amount of time after transmitting the first series of reverse wake up data frames, transmitting a second series of reverse wake up data frames.

11. The method of claim 9, wherein each reverse wake up data frame includes an identifier of the secondary network node, an identifier of the exception event, a number of reverse wake up data frames included in the series of reverse wake up data frames, and an indicator of a current reverse wake up data frame being transmitted in the series of reverse wake up data frames.

12. The method of claim 9, further comprising:
while in a low power state, waking, by the primary network node, from the low power state for a sample duration;
performing, by the primary network node, sampling during the sample duration;
responsive to not detecting a reverse wake up data frame via the sampling, returning, by the primary network node, to the low power state; and
responsive to detecting a reverse wake up data frame from among the series of reverse wake up data frames, transmitting, by the primary network node, the synchronization frame after an end of the series of reverse wake up data frames.

13. The method of claim 9, further comprising providing, by the secondary network node, each reverse wake up data frame including an identifier of the exception event.

14. The method of claim 9, wherein controlling the secondary network node includes instructing the secondary network node to enter a low power state.

15. The method of claim 9, wherein the secondary network node is coupled to a set of battery cells, and wherein controlling the secondary network node includes disabling at least one battery cell of the set of battery cells.

16. A method, comprising:
while in a low power state, waking, by a primary network node, from the low power state for a sample duration;
performing, by the primary network node, sampling during the sample duration;
responsive to not detecting a reverse wake up data frame via the sampling, returning, by the primary network node, to the low power state; and
responsive to detecting a reverse wake up data frame from among a series of reverse wake up data frames transmitted by a secondary network node, transmitting, by the primary network node, a synchronization frame after an end of the series of reverse wake up data frames.

17. The method of claim 16, wherein the secondary network node is coupled to a set of battery cells, the method further comprising:
responsive to determination of an exception event associated with at least one battery cell of the set of battery cells, transmitting, by the secondary network node, the series of reverse wake up data frames; and
responsive to receipt of the synchronization frame from the primary network node after transmitting the series of reverse wake up data frames, transmitting, by the secondary network node, an uplink data frame to the primary network node.

18. The method of claim 16, wherein each reverse wake up data frame includes an identifier of an exception event.

19. The method of claim 18, further comprising receiving, responsive to transmitting the synchronization frame, an uplink data frame from the secondary network node, the uplink data frame including battery cell information related to the exception event.

20. The method of claim 19, wherein each reverse wake up data frame further includes an identifier of the secondary network node, a number of reverse wake up data frames included in the series of reverse wake up data frames, and an indicator of a current reverse wake up data frame being transmitted in the series of reverse wake up data frames.

* * * * *